April 30, 1940.  L. E. WELLS  2,199,378
STORAGE BATTERY LIFTER
Filed June 18, 1938
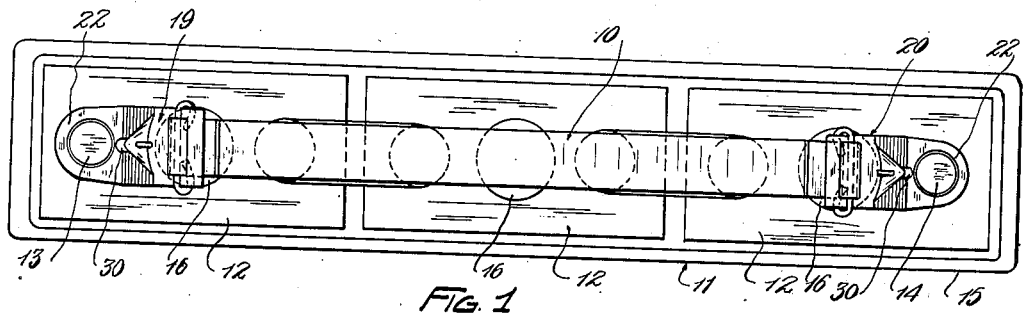
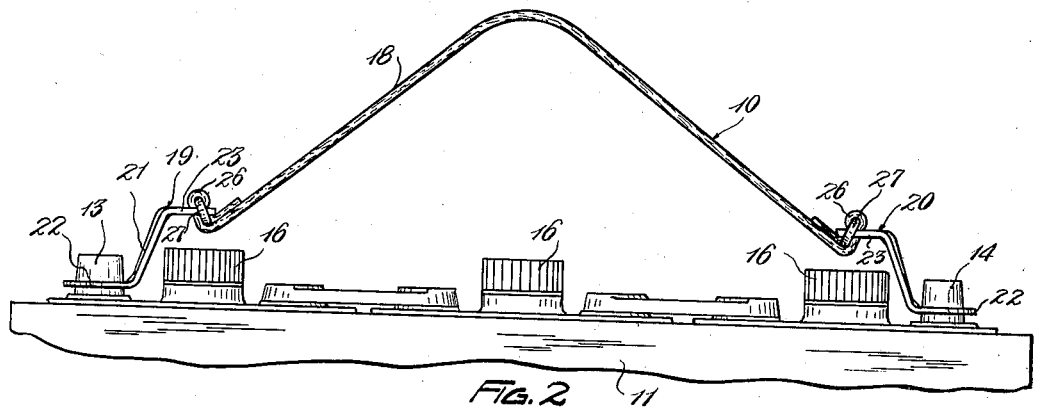
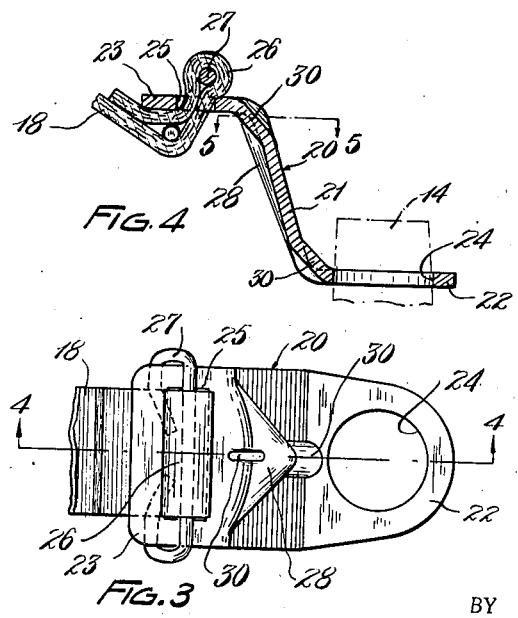
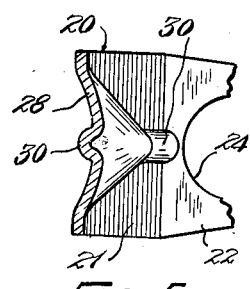
INVENTOR.
LELAND E. WELLS
BY Kwis Hudson & Kent
ATTORNEYS Patented Apr. 30, 1940

2,199,378

UNITED STATES PATENT OFFICE 2,199,378

STORAGE BATTERY LIFTER

Leland E. Wells, Cleveland Heights, Ohio, assignor to Willard Storage Battery Company, Cleveland, Ohio, a corporation of West Virginia Application June 18, 1938, Serial No. 214,511

2 Claims. (Cl. 294—92)

This invention relates to lifting devices and more particularly to an improved storage battery lifter. The present invention is an improvement over Patent No. 1,908,926 issued May 16, 1933.

An object of this invention is to provide an improved storage battery lifter of simple and economical construction and which has gripping members of novel form adapted for lifting engagement with the terminal posts of a storage battery.

Another object of this invention is to provide an improved lifter for storage batteries of the type having terminal posts and relatively high vent plugs close to such posts and in which the gripping elements are of a novel construction affording proper engagement with the posts without interference with the vent plugs.

A further object of my invention is to provide an improved storage battery lifter having an elongated flexible handle and Z-like gripping elements connected thereto for gripping engagement with the terminal posts of the battery.

The invention may be further briefly summarized as consisting in certain novel features of construction and combinations of parts hereinafter described and particularly set out in the appended claims.

In the accompanying sheet of drawings,

Fig. 1 is a top plan view showing a storage battery with my improved lifting device applied to the terminal posts thereof;

Fig. 2 is a fragmentary side elevation of the storage battery showing my lifting device applied to the terminal post thereof;

Fig. 3 is a plan view, on a somewhat larger scale, showing one of the gripping members and the connection thereof with the flexible handle;

Fig. 4 is a longitudinal sectional view taken through one of the gripping members as indicated by line 4—4 of Fig. 3; and Fig. 5 is a transverse sectional view taken through one of the gripping members as indicated by line 5—5 of Fig. 4.

More detailed reference will now be made to the accompanying drawing in which I have illustrated the preferred forms of construction and the intended manner of use of my improved storage battery lifter. It should be understood, of course, that the invention is not necessarily limited to the particular forms of the lifter herein disclosed nor to the use of my lifter with the particular type of battery shown in the drawing.

In Figs. 1 and 2 of the drawing I show my lifting device 10 applied to a storage battery 11 for lifting or carrying thereof. The storage battery shown in this instance is a relatively long one in which the cells 12 are arranged in end to end relation and in which the terminal posts 13 and 14 are located adjacent the outer ends of the battery box 15. The battery 11 also has relatively high vent plugs 16 which are disposed substantially in line with the terminal posts and located relatively close to such posts.

My improved lifter 10 comprises an elongated handle 18 which may be flexible throughout its length, and gripping members 19 and 20 which are connected with the ends of the handle and are adapted for gripping engagement with the terminal posts 13 and 14. The handle 18 may be constructed of any suitable material or substance having the requisite tensile strength for lifting and carrying a storage battery and which is nonconducting so as to prevent short-circuiting between the two terminal posts. The handle may also be of any suitable cross-sectional shape, but, as shown in this instance, I prefer to make the handle in the form of a flexible strap. A strap suitable for this purpose may be formed of leather, fabric, rubberized fabric, or any other suitable material.

The gripping members 19 and 20 may each comprise a one-piece metallic plate structure having an intermediate body portion 21 and oppositely extending portions 22 and 23 connected with the ends of such body portion. The end portion 22 is provided with an opening 24 of a size and shape to receive the terminal post and to cause gripping engagement with the post upon tilting of the gripping member relative to the post axis. The other end portion 23 is adapted for connection with an end of the strap or handle 18, and this connection with the handle may be made in various ways. In this instance I show a handle connection similar to that disclosed in said prior patent, that is to say, the end portion 23 is provided with a slot 25 through which a doubled portion 26 of the flexible handle extends and a wire locking member or clamp cooperates with the doubled portion of the handle for preventing the withdrawal of the same from the slot. The gripping members may be produced by any suitable operations, such as by stamping operations performed on sheet metal.

To prevent interference between the gripping members and the adjacent vent plugs 16 when the gripping members are applied to the terminal posts of the battery, I construct the gripping members so that the intermediate or body portion 21 thereof is inclined relative to the axis of the terminal post and of a length such that the end portion 23 will extend laterally above the vent plug, as shown in Fig. 2. To obtain the desired lever action and gripping effect when the device is applied to the terminal posts and a lifting effort exerted on the handle, I arrange the end portions 22 and 23 of the gripping members to extend substantially oppositely to each other, that is, laterally in vertically spaced planes. These end portions preferably are substantially parallel to each other, although if desired, the planes in which they lie may extend in angular relation to each other. In other words, the gripping members 19 and 20 are of Z-like form, as shown in Fig. 2, so that when they are applied to the terminal posts of a battery of the type here illustrated they will not interfere with the vent plugs and will afford prompt and firm gripping engagement with the terminal posts when lifting effort is applied to the handle.

For reenforcing the body portion 21 of the gripping members and also to afford additional clearance for the vent plugs 16, I may form such body portion with a dished or bowed shape as shown in the drawing. The dishing of the body portion 21 is preferably such that a concave recess 28 is formed in the back or underside thereof, that is, in the side nearest the vent plug. Such dishing of the body portion of the gripping members may be omitted if desired but is preferable for the reasons just explained. Further reenforcing for the gripping members may be provided in the form of one or more small ribs 30 which may be stamped in the metal to extend across the bends at the junction of the end portions 22 and 23 with the body portion 21. These ribs may be provided or, if desired, can be omitted.

From the foregoing description and the accompanying drawing it will now be readily seen that I have provided an improved storage battery lifter of simple and economical construction and with which storage batteries can be conveniently lifted and carried without danger of the gripping members becoming disengaged from the terminal posts and without interference between the gripping members and the vent plugs even though the latter may be relatively high and close to the terminal posts. It will be seen, furthermore, that the gripping members of my lifting device are strong and rigid and, by reason of their shape, will afford prompt and firm gripping engagement with the terminal posts as soon as lifting effort is applied to the flexible handle.

Having thus described my invention, I claim:

1. A storage battery lifting device comprising an elongated flexible handle, and gripping members connected with opposite ends thereof and each comprising a substantially rigid one-piece plate structure having a dished intermediate portion and laterally and oppositely extending substantially flat end portions, one of such end portions having an end of the flexible handle connected therewith and the other having an opening therein of a size to receive and grip a post of the battery.

2. A storage battery lifting device comprising an elongated flexible handle, and gripping members connected with opposite ends thereof and each comprising a substantially rigid one-piece plate structure having an inclined intermediate portion concavely dished on the underside thereof and end portions extending oppositely therefrom in substantially parallel planes, one of such end portions having an end of the flexible handle connected therewith and the other having an opening therein of a size to receive and grip a post of the battery.

LELAND E. WELLS.